United States Patent [19]

Garretson

[11] Patent Number: 5,055,066

[45] Date of Patent: Oct. 8, 1991

[54] ELECTRICAL CONNECTOR COVER HAVING INTEGRAL CABLE STRAP

[75] Inventor: Jay H. Garretson, Warren, Ohio

[73] Assignee: General Motors Corporation, Detroit, Mich.

[21] Appl. No.: 490,225

[22] Filed: Mar. 8, 1990

[51] Int. Cl.5 ............................................. H01R 13/58
[52] U.S. Cl. .................................... 439/464; 24/16 PB
[58] Field of Search ................. 439/464, 471; 174/135; 24/16 PB

[56] References Cited

U.S. PATENT DOCUMENTS

| | | | |
|---|---|---|---|
| 3,321,733 | 5/1967 | Thomas | 339/90 |
| 3,711,632 | 1/1973 | Ghirardi | 174/135 |
| 3,711,633 | 10/1973 | Ghirardi et al. | 174/135 |
| 3,735,448 | 5/1973 | Waddington | 24/16 PB |
| 3,874,765 | 4/1975 | Gilmore et al. | 339/103 |
| 3,936,129 | 2/1976 | Guy | 439/464 |
| 4,473,524 | 9/1984 | Paradis | 24/16 PB |
| 4,784,358 | 11/1988 | Kohut | 248/74.3 |
| 4,842,550 | 6/1989 | Fry, Jr. et al. | 439/471 |
| 4,944,475 | 7/1990 | Ono et al. | 248/71 |

Primary Examiner—Gary F. Paumen
Attorney, Agent, or Firm—F. J. Fodale

[57] ABSTRACT

An automotive power plant has an electrically controlled transmission 12 which is connected to control modules by a wiring harness. The end of the wiring harness is attached to the transmission by an electrical connector which has a spring like thermoplastic cover which is secured to the insulator body of the electrical connector by a bayonet slot arrangement and which has an integral cable strap for securing an end of a convoluted conduit forming part of the wiring harness.

9 Claims, 2 Drawing Sheets

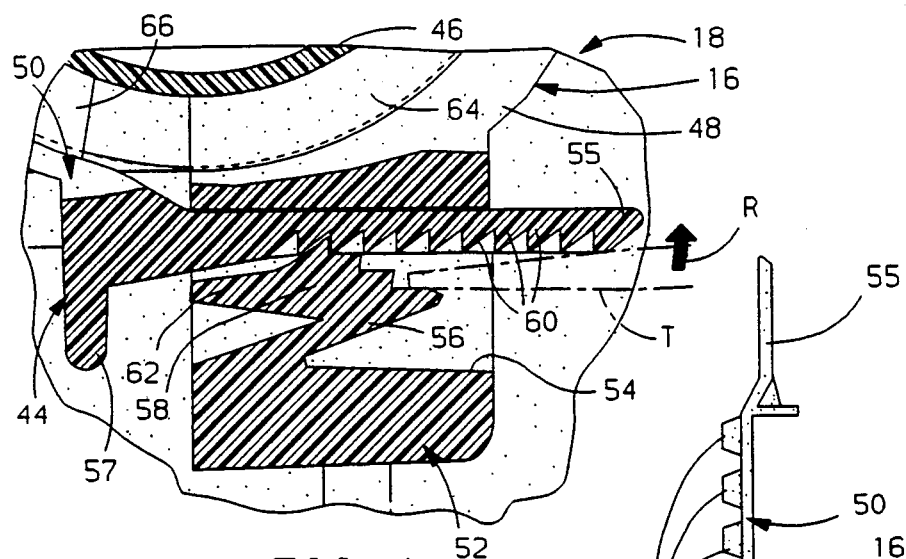
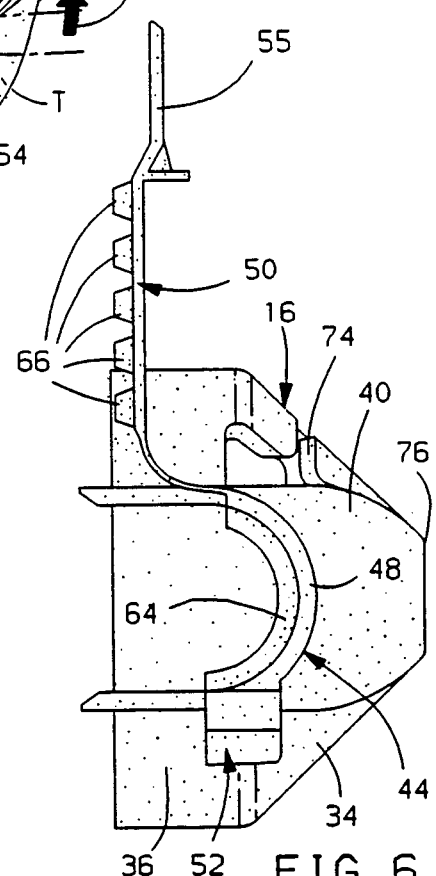
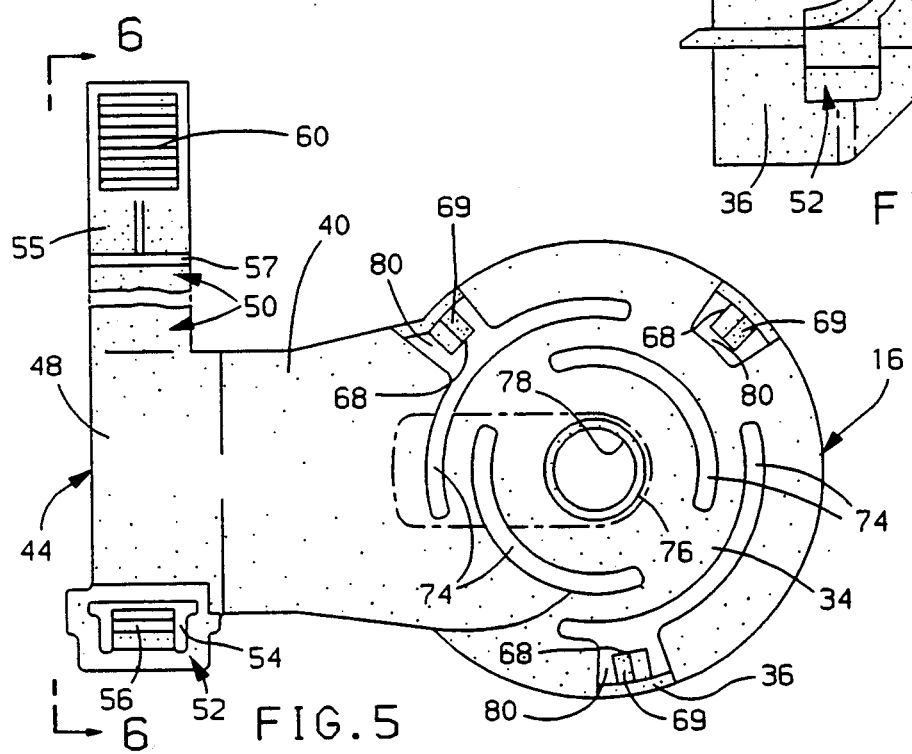

ELECTRICAL CONNECTOR COVER HAVING INTEGRAL CABLE STRAP

BACKGROUND OF THE INVENTION

This invention relates generally to electrical connectors and more specifically to covers for electrical connectors which have a plurality of electric wires extending out of an end of an insulator body.

This invention may be used in combination with the invention of my co-pending patent application U.S. Ser. No. 07/490,202 filed Mar. 8, 1990.

It is already known to provide covers which are attached to insulator bodies of electrical connectors to protect and route several electric wires extending out of the insulator body. See for instance, U.S. Pat. No. 3,874,765 granted to Earl A. Gilmore and Kenneth E. Merklen Apr. 1, 1975 which discloses a connector cover which is constructed of sheet material and shaped to cooperate with a tying strap for the electric wires. The tying strap may be a separate wire, string or cord or it may be a plastic strap which is attached to the cover by heat welding or through use of a separate fastener. Thus these prior art constructions require manufacture of a separate tying strap which then must either be handled as a loose piece until final assembly or attached to the cover by a secondary manufacturing process. Either alternative is time consuming and costly.

Another drawback of these prior art constructions is that the tying straps are not suitable for securing convoluted conduit which is commonly used to wrap the electric wires of wiring harnesses, particularly in automotive applications. See for instance, U.S. Pat. No. 3,711,632 granted to Paul S. Ghirardi Jan. 16, 1973; U.S. Pat. No. 3,711,633 granted to Paul S. Ghirardi and Eugene V. McGowan Jan. 16 1973; and U.S. Pat. No. 4,784,358 granted to James K. Kohut Nov. 15, 1988 which show fittings and cable straps for convoluted conduit.

SUMMARY OF THE INVENTION

The object of this invention is to provide an improved cable strap and an improved electrical connector cover having such a cable strap.

Another object of this invention is to provide an improved electrical connector cover in which the cable strap is an integral part of the electrical connector cover so that the electrical connector cover and strap can be economically manufactured by molding the electrical connector cover as one piece of thermoplastic material.

Yet another object of this invention is to provide an improved cable strap which can be adapted for securing a convoluted conduit and an improved electrical connector cover having such a cable strap as an integral part of the electrical connector cover.

Still yet another object of this invention is to provide a cable strap having an improved buckle arrangement and an improved electrical connector cover having such a cable strap as an integral part of the electrical connector cover.

Other objects and features of the invention will become apparent to those skilled in the art as disclosure is made in the following detailed description of a preferred embodiment of the invention which sets forth the best mode of the invention contemplated by the inventors and which is illustrated in the accompanying sheet(s) of drawing.

BRIEF DESCRIPTION OF THE DRAWINGS

FIG. 4 is an enlargement of a portion of FIG. 3.

FIG. 5 is a top view of the cover which is shown in FIGS. 1, 2, 3 and 4 illustrating an integral cable strap of the cover in an open position.

FIG. 6 is a end view of the cover taken substantially along the line 6—6 of FIG. 5 looking in the direction of the arrows.

DETAILED DESCRIPTION OF THE PREFERRED EMBODIMENT

Figure 1:
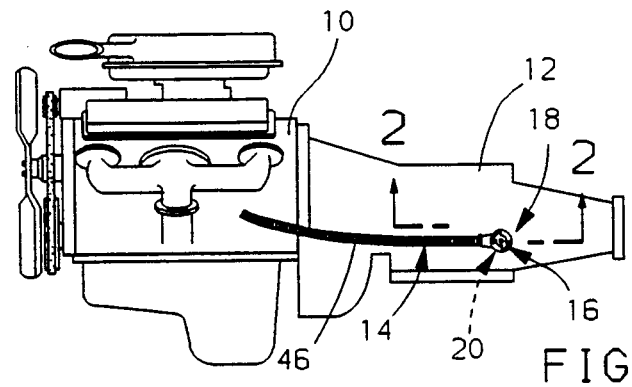
FIG. 1 is an elevational view of an automotive power plant having an electrically controlled transmission which is energized by a wiring harness which includes a cover of this invention for an electrical connector which attaches the wiring harness to the transmission.

Referring now to the drawing, FIG. 1 illustrates an automotive power plant 10 having an electrically controlled transmission 12 which is by control modules (not shown) connected to the transmission by a wiring harness 14. The wiring harness 14 includes a cover 16 of this invention for an electrical connector 18 which attaches an end of the the wiring harness to the transmission.

Figure 2:
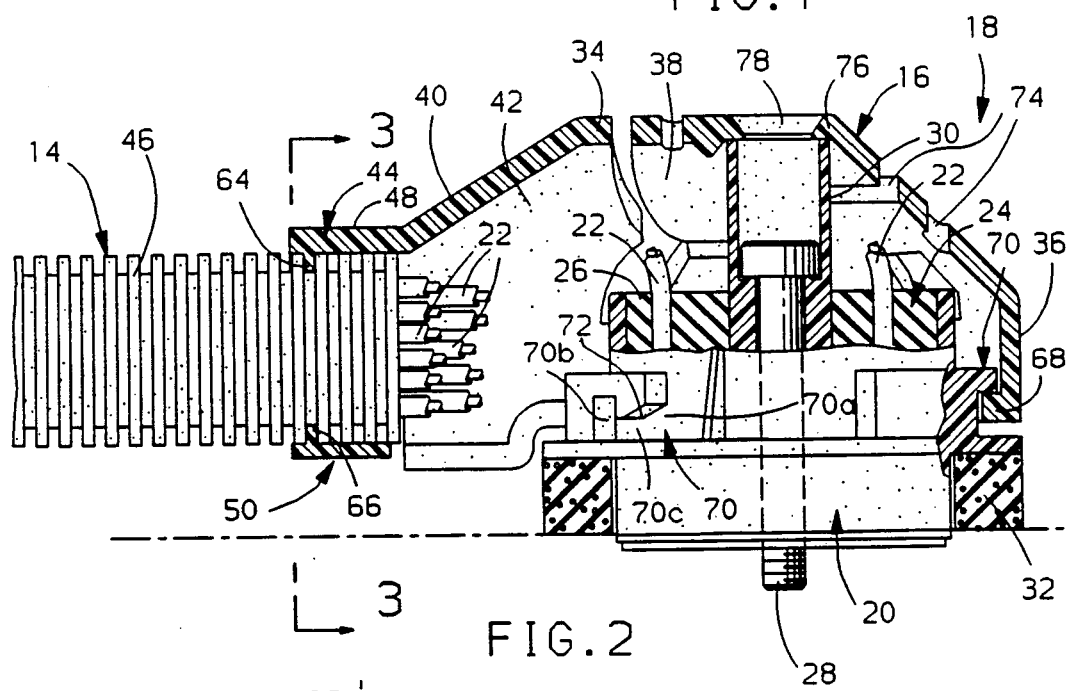
FIG. 2 is a section taken substantially along the line 2—2 of FIG. 1 looking in the direction of the arrows and showing the electrical connector and cover at the end of the wiring harness shown in greater detail.
Figure 3:
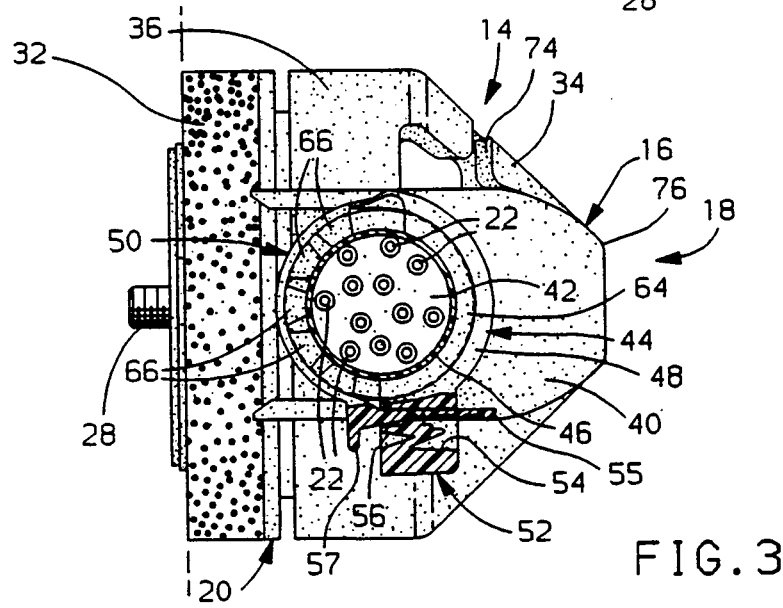
FIG. 3 is a section taken substantially along the line 3—3 of FIG. 2 looking in the direction of the arrows.

Referring now to FIGS. 2 and 3, it can be seen that the electrical connector 18 at the end of the wiring harness 14 comprises a thermoplastic insulator body 20 which contains a plurality of electric terminals (not shown) attached to a plurality of electric wires 22 which extend out a sealed end of the connector body 20 which houses a cable seal 24.

The electrical connector 18 plugs onto a connector portion of the electrically controlled transmission 12 (not shown) and is secured to the transmission housing by a bolt 28 which extends through a tower 30 of the connector body 20. An annular gasket 32 seals the interface between the insulator body 20 and the transmission housing when the electrical connector 18 is bolted down.

The electrical connector 18 has a cover 16 which is also made of a thermoplastic. The cover 16 comprises a dome 34 which has a rim 36 which is secured to the sealed end of the insulator body 20 so that an interior space of the dome forms a chamber 38 which receives the electric wires 22 extending out of the sealed end of the insulator body 20. The cover 16 further comprises a transition channel 40 which is integrally attached to the dome 34 at one end to form a transverse passage 42 leading out of the interior space of the dome 34 for the electric wires 22 to exit the chamber 38. A strap 44 is integrally attached to an opposite end of the transition channel 40 for bundling the electric wires 22 exiting the passage 42. The strap 44 secures an end of a convoluted conduit 46 which forms part of the wiring harness 14 which contains the electric wires 22 exiting the passage 42 to the cover 16.

Focusing now on FIGS. 4, 5 and 6, it is seen that the strap 44 comprises a stiff upper shell 48 which is integrally attached to the end of the transition channel 40 and a flexible lower strap 50 which is integrally attached to the shell 48 at one end. The stiff upper shell 48 has a buckle 52 at the opposite end and it is semicircular in cross section.

The buckle 52 includes a slot 54 which extends through the buckle for receiving a free end 55 of the flexible lower strap 50. The buckle 52 contains a depending, V-shaped pawl 56 disposed in the slot 54 which engages the free end 55 of the flexible lower strap 50 when it is inserted into the slot 54 via an entrance opening at a lower end of the slot 54, i.e. the left end as viewed in FIG. 4. The flexible strap 50 has a tab 57 adjacent the free end 55 which provides a finger grip to facilitate insertion of the free end 55 into the slot 54.

The depending, V-shaped pawl 56 opens toward the entrance opening of the slot 54 through which the free end 55 of the flexible strap 50 is inserted into the slot 54. The V-shaped pawl 56 has a serrated leg 58 which engages cooperating serrations 60 incorporated into the the free end 55 of the flexible lower strap 50. The serrated leg 58 has a strain relief 62 at its free end which engages the flexible strap 50 and maintains the serrated leg 58 in firm seated engagement with the cooperating serrations 60 responsive to attempted pullout of the engaged free end of the flexible strap 50 from the buckle 52, that is, movement of the strap toward the left as viewed in FIG. 4. This secure engagement of the cooperating serrations is enhanced by the orientation of the V-shaped pawl 56 in the slot 54.

The orientation of the V-shaped pawl 56 in the slot 54 also makes it possible to disengage the pawl 56 from the free end 55 of the flexible strap 50 by a prying action of a screw driver blade or similar tool T inserted into the opposite or exit opening of the slot 54 which is at the upper end of the buckle 52. More specifically the tip of the screw driver blade or the like is inserted between the serrated leg 58 and the free end 55 of the strap 50 via the exit opening as shown in phantom in FIG. 4. The pawl 56 is then pried away from the serrations 60 of the strap by rotating the screw driver tip counterclockwise as indicated by the arrow R. This rotates the pawl 56 clockwise and out of engagement with the serrations 60 of the strap 50 when the strain relief 62 is fulcrummed on the strap 50. Thus the strain relief 62 also facilitates disengagement of the pawl 56 by the tool T inserted into the exit opening of the slot 54. The stiff upper shell 48 has an arcuate rib 64 and the flexible lower strap 50 has a plurality of spaced rib segments 66 which are substantially coplanar with the arcuate rib 64 of the stiff upper shell 48 as best shown in FIGS. 2, 3 and 6. The arcuate rib 64 and the rib segments 66 engage in a trough of the convoluted conduit 46 when the end of the convoluted conduit 46 is secured to the cover 16 by the strap 44 as best shown in FIGS. 2 and 3.

The thermoplastic cover 16 is attached to the insulator body 20 of the electrical connector 18 by a bayonet slot arrangement. More specifically, the rim 36 of the cover 16 has three circumferentially spaced lugs 68 which project inwardly and include down ramps 69 facing the dome 34 as best shown in FIG. 5. These three lugs 68 with J-shaped bayonet slots 70 are formed in the periphery of the insulator body 20 to secure the cover 16 to the insulator body 20 as best shown in FIGS. 2 and 3. Each of the J-shaped bayonet slots 70 comprises an axial entrance portion 70a, an axial detent portion 70b and a circumferential crossover portion 70c which is partially defined by a ramp 72 which leads downwardly from the entrance portion 70a to the detent portion 70b.

The cover 16 has a plurality of circumferential slots 74 which are located in the dome 34 and transition channel 40 between a peak 76 of the dome 34 and the rim 36 whereby the cover 16 is made somewhat resilient and acts as a tension spring which retains the lugs 68 in the detent portions 70b of the J-shaped bayonet slots 70 when an upward force is applied to the inside surface of the peak 76. The tower 30 of the insulator body 20 is sized to provide such a force when the cover 16 is the assembled position shown in FIGS. 2 and 3. It has been found that the circumferential slots 74 may be arrayed in inner and outer sets of two circumferentially spaced arcuate slots each to provide the requisite resiliency and tension spring qualities. The cover 16 further includes an access hole 78 in the peak 76 for tightening down the bolt 28 when the cover 16 is in place and three access slots 80 which facilitate molding of the lugs 68.

The cover 16 is secured to the connector body 20 by aligning the three lugs 68 with the entrance portions 70a of the J-shaped bayonet slots 70. It should be noted that the lugs 68 and cooperating bayonet slots 70 are not evenly circumferentially spaced so that the cover 16 attaches to the insulator body 20 only when the cover 16 is correctly orientated. When correctly oriented, the cover 70 is simply pushed down against the tower 30 and rotated clockwise until the lugs 68 are engaged in the detent portions 70b where the lugs 68 are retained by the tension spring action of the cover 16. Rotation of the cover 16 against the action of the resilient cover 16 is assisted by the mating ramps 69 and 72 which push the cover 16 down on the insulator body 20 as the cover 16 is rotated.

It should also be noted that the transition channel 44 which extends outwardly of the dome 34 provides a convenient handle for rotating the cover 16 and the lugs 68 into and out of the detent portions 70b of the J-shaped bayonet slots 70.

I wish it to be understood that I do not desire to be limited to the exact details of construction shown and described, for obvious modifications will occur to a person skilled in the art.

The embodiments of the invention in which an exclusive property or privilege is claimed are defined as follows:

1. A thermoplastic cover for an electrical connector having a plurality of electric wires extending out of an end of an insulator body, comprising, a dome having a rim which is adapted to be secured to the end of the insulator body so that an interior space of the dome forms a chamber for receiving the electric wires extending out of the end of the insulator body, a transition channel which is integrally attached to the dome at one end to form a transverse passage leading out of the interior space of the dome for the electric wires to exit the chamber, and a cable strap which is integrally attached to an opposite end of the transition channel for bundling the electric wires exiting the passage, the cable strap comprising an stiff upper shell which is integrally attached to the end of the transition channel and a flexible lower strap which is integrally attached to the shell at one end, the stiff upper shell having a buckle at the opposite end for fastening a free end of the flexible lower strap, the buckle includes a slot which extends therethrough for receiving the free end of the flexible lower strap when it is fastened by the buckle and a depending, V-shaped pawl disposed in the slot 23 the slot having an entrance opening at one end through which the free end of the flexible strap is inserted and an exit opening at the opposite end, the V-shaped pawl being oriented in the slot so that the pawl opens toward the entrance slot opening of the slot and the pawl may be disengaged by a tool inserted into the exit opening of the slot.

2. The thermoplastic cover as defined in claim 1 wherein the V-shaped pawl has a serrated leg for engaging the free end of the flexible lower strap which has cooperating serrations and wherein the serrated leg has a strain relief at its free end which engages the flexible lower strap to retain the serrated leg in firm engagement with the cooperating serrations of the flexible lower strap responsive to attempted pull out of the free end of the flexible lower strap from the buckle or to facilitate disengagement of the pawl by a tool inserted between the serrated leg and the buckle via the exit opening of the slot.

3. A thermoplastic cover of molded one piece construction for an electrical connector having a plurality of electric wires extending out of an end of an insulator body, comprising:

a dome having a rim which is adapted to be secured to the end of the insulator body so that an interior space of the dome forms a chamber for receiving the electric wires extending out of the end of the insulator body, a transition channel which is integrally attached to the dome at one end to form a transverse passage leading out of the interior space of the dome for the electric wires to exit the chamber, a cable strap which is integrally attached to an opposite end of the transition channel for bundling the electric wires exiting the passage, the strap comprising a stiff upper shell which is integrally attached to the end of the transition channel and a flexible lower strap which is integrally attached to the shell at one end, and the stiff upper shell having a buckle at the opposite end having means for fastening a free end of the flexible lower strap, the buckle including a slot which extends through the buckle for receiving the free end of the flexible lower strap when it is fastened by the buckle, the stiff upper shell having an arcuate rib and the flexible lower strap having a plurality of spaced rib segments which are substantially coplanar with the arcuate rib of the stiff upper shell, the arcuate rib and the rib segments being adapted to engage a trough of a convoluted conduit whereby the strap is adapted to secure an end of a convoluted conduit which forms part of a wiring harness which contains the electric wires exiting the passage of the cover.

4. The thermoplastic cover as defined in claim 3 wherein the buckle has a depending V-shaped pawl disposed in the slot, the slot having has an entrance opening at one end through which the free end of the flexible strap is inserted and an exit opening at the opposite end, the V-shaped pawl being oriented in the slot so that the pawl may be disengaged by a tool inserted into the exit opening of the slot.

5. The thermoplastic cover as defined in claim 4 wherein the V-shaped pawl has a serrated leg for engaging the free end of the flexible lower strap which has cooperating serrations and wherein the serrated leg has a strain relief at its free end which engages the flexible lower strap to retain the serrated leg in firm engagement with the cooperating serrations of the flexible lower strap responsive to attempted pull out of the free end of the flexible lower strap from the buckle or to facilitate disengagement of the pawl by a tool inserted between the serrated leg and the buckle via the exit opening of the slot.

6. A thermoplastic strap for securing a convoluted conduit which forms part of a wiring harness, comprising:

a stiff upper shell which is integrally attached to a support member and a flexible lower strap which is integrally attached to the stiff upper shell at one end, the stiff upper shell having a buckle at an opposite end which includes a slot which extends through the buckle for receiving a free end of the flexible lower strap, and the buckle containing a depending V-shaped pawl which engages the free end of the flexible lower strap to secure it in the buckle and which opens toward an entrance opening at one end of the slot through which the free end of the flexible lower strap is inserted whereby the pawl may be disengaged by a tool inserted into an exit opening at the opposite end of the slot.

7. The thermoplastic strap as defined in claim 6 wherein the V-shaped pawl has a serrated leg for engaging the free end of the flexible lower strap which has cooperating serrations and wherein the serrated leg has a strain relief at its free end which engages the flexible lower strap to retain the serrated leg in firm engagement with the cooperating serrations of the flexible lower strap responsive to attempted pull out of the free end of the flexible lower strap from the buckle or to facilitate disengagement of the pawl by a tool inserted between the serrated leg and the buckle via the exit opening of the slot.

8. A thermoplastic strap for securing a convoluted conduit which forms part of a wiring harness, comprising:

a stiff upper shell which is integrally attached to a support member and a flexible lower strap which is integrally attached to the stiff upper shell at one end, the stiff upper shell having a buckle at an opposite end which includes a slot which extends through the buckle for receiving a free end of the flexible lower strap, the stiff upper shell having an arcuate rib and the flexible lower strap having a plurality of spaced rib segments which are substantially coplanar with the arcuate rib of the stiff upper shell, the arcuate rib and the rib segments being adapted to engage a trough of a convoluted conduit when it is secured by the strap, and the buckle containing a depending V-shaped pawl which engages the free end of the flexible lower strap to secure the strap in the buckle and which opens toward an entrance opening at one end of the slot through which the free end of the flexible lower strap is inserted whereby the pawl may be disengaged by a tool inserted into an exit opening at the opposite end of the slot.

9. The thermoplastic strap as defined in claim 8 wherein the V-shaped pawl has a serrated leg for engaging the free end of the flexible lower strap which has cooperating serrations and wherein the serrated leg has a strain relief at its free end which engages the flexible lower strap to retain the serrated leg in firm engagement with the cooperating serrations of the flexible lower strap responsive to attempted pull out of the free end of the flexible lower strap from the buckle or to facilitate disengagement of the pawl by a tool inserted between the serrated leg and the buckle via the exit opening of the slot.

* * * * *